(12) United States Patent
Miyagawa et al.

(10) Patent No.: US 8,698,962 B2
(45) Date of Patent: Apr. 15, 2014

(54) CONTENT PROCESSING DEVICE

(75) Inventors: Tatsuo Miyagawa, Osaka (JP); Seiji Miyabe, Osaka (JP); Hirokazu Suzu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 597 days.

(21) Appl. No.: 12/702,418

(22) Filed: Feb. 9, 2010

(65) Prior Publication Data
US 2010/0201873 A1    Aug. 12, 2010

(30) Foreign Application Priority Data

Feb. 12, 2009   (JP) ................................. 2009-029357

(51) Int. Cl.
*H04N 5/62* (2006.01)
*H04N 5/44* (2011.01)

(52) U.S. Cl.
USPC ............................ 348/738; 348/725; 348/553

(58) Field of Classification Search
None
See application file for complete search history.

(56) References Cited

U.S. PATENT DOCUMENTS

| 2003/0126974 A1* | 7/2003 | Ishiwaka et al. ................. 84/615 |
| 2006/0044976 A1 | 3/2006 | Ishiguchi |
| 2006/0291806 A1* | 12/2006 | Ikeda et al. ...................... 386/95 |
| 2007/0147791 A1 | 6/2007 | Kawachi |
| 2007/0283392 A1* | 12/2007 | Tsusaka et al. .................. 725/47 |
| 2008/0063373 A1* | 3/2008 | Hamada et al. ............... 386/106 |

FOREIGN PATENT DOCUMENTS

| JP | 2008-028950 A | 2/2008 |
| JP | 2008-061251 A | 3/2008 |

* cited by examiner

*Primary Examiner* — Jefferey Harold
*Assistant Examiner* — Michael Teitelbaum
(74) *Attorney, Agent, or Firm* — Global IP Counselors, LLP

(57) ABSTRACT

A content processing device includes an input section, a memory section, a selection section and an output section. The input section is configured to receive content having a video signal and a plurality of audio signals with different audio types. The memory section is configured to store selection information indicative of a predetermined audio type, and order information indicative of a preset order of a plurality of audio types. The selection section is configured to select one of the audio signals based on the selection information and the order information. The output section is configured to output the video signal and the one of the audio signals that was selected by the selection section.

12 Claims, 5 Drawing Sheets

INSERSION ORDER

| | AUDIO TYPES FOR A PROGRAM | |
|---|---|---|
| | Audio Codec | Number of Channel |
| 1 | MPEG1 | 1CH |
| 2 | Dolby Digital | 2CH |
| 3 | Dolby Digital Plus | 5.1CH |
| 4 | HE-AAC | 2CH |

| SELECTED AUDIO | |
|---|---|
| Audio Codec | Number of Channel |
| Dolby Digital Plus | 5.1CH |

*FIG. 3A*

INSERSION ORDER

| | AUDIO TYPES FOR A PROGRAM | |
|---|---|---|
| | Audio Codec | Number of Channel |
| 1 | MPEG1 | 1CH |
| 2 | Dolby Digital | 2CH |
| 3 | HE-AAC | 2CH |

| SELECTED AUDIO | |
|---|---|
| Audio Codec | Number of Channel |
| MPEG1 | 1CH |

*FIG. 3B*

SELECTION ORDER

| | Stream_content | Component_type | Description |
|---|---|---|---|
| 1 | 0x06 | 0x03 | HE-AAC audio, stereo |
| 2 | 0x04 | 0x00 to 0x7F | reserved for AC-3 audio modes (refer to table D.1) |
| 3 | 0x02 | 0x03 | MPEG-1 Layer 2 audio, stereo (2 channel) |
| 4 | 0x06 | 0x01 | HE-AAC audio, single mono channel |
| 5 | 0x02 | 0x01 | MPEG-1 Layer 2 audio, single mono channel |

*FIG. 3C*

COMPONENT DESCRIPTOR

| Syntax | Number of bits | Identifier |
|---|---|---|
| component_descriptor () { | | |
| descriptor_tag | 8 | uimsbf |
| descriptor_length | 8 | uimsbf |
| reserved_future_use | 4 | bslbf |
| stream_content | 4 | uimsbf |
| component_type | 8 | uimsbf |
| component_tag | 8 | uimsbf |
| ISO_639_language_code | 24 | bslbf |
| for (i=0; i<N, i++) { | | |
| text_char | 8 | uimsbf |
| } | | |
| } | | |

*FIG. 5*

Stream_content and component_type

| Stream_content | Component_type | Description |
|---|---|---|
| 0x02 | 0x00 | reserved for future use |
| 0x02 | 0x01 | MPEG-1 Layer 2 audio, single mono channel |
| 0x02 | 0x02 | MPEG-1 Layer 2 audio, dual mono channel |
| 0x02 | 0x03 | MPEG-1 Layer 2 audio, stereo (2 channel) |
| 0x02 | 0x04 | MPEG-1 Layer 2 audio, multi-lingual, multi-channel |
| 0x02 | 0x05 | MPEG-1 Layer 2 audio, surround sound |
| 0x02 | 0x06 to 0x3F | reserved for future use |
| 0x02 | 0x40 | MPEG-1 Layer 2 audio description for the visually impaired |
| 0x02 | 0x41 | MPEG-1 Layer 2 audio for the hard of hearing |
| 0x02 | 0x42 | receiver-mixed supplementary audio as per annex G of TS 101 154 [9] |
| 0x02 | 0x43 to 0xAF | reserved for future use |
| 0x02 | 0xB0 to 0xFE | user-defined |
| 0x02 | 0xFF | reserved for future use |
| 0x04 | 0x00 to 0x7F | reserved for AC-3 audio modes (refer to table D.1) |
| 0x04 | 0x80 to 0xFF | reserved for enhanced AC-3 audio modes (refer to table D.1) |
| 0x06 | 0x00 | reserved for future use |
| 0x06 | 0x01 | HE-AAC audio, single mono channel |
| 0x06 | 0x02 | reserved for future use |
| 0x06 | 0x03 | HE-AAC audio, stereo |
| 0x06 | 0x04 | reserved for future use |
| 0x06 | 0x05 | HE-AAC audio, surround sound |
| 0x06 | 0x06 to 0x3F | reserved for future use |
| 0x06 | 0x40 | HE-AAC audio description for the visually impaired |
| 0x06 | 0x41 | HE-AAC audio for the hard of hearing |
| 0x06 | 0x42 | HE-AAC receiver-mixed supplementary audio as per annex G of TS 101 154 [9] |
| 0x06 | 0x43 | HE-AAC v2 audio, stereo |
| 0x06 | 0x44 | HE-AAC v2 audio description for the visually impaired |
| 0x06 | 0x45 | HE-AAC v2 audio for the hard of hearing |
| 0x06 | 0x46 | HE-AAC v2 receiver-mixed supplementary audio as per annex G of TS 101 154 [9] |
| 0x06 | 0x47 to 0xAF | reserved for future use |
| 0x06 | 0xB0 to 0xFE | user-defined |
| 0x06 | 0xFF | reserved for future use |

FIG. 6

CONTENT PROCESSING DEVICE

CROSS-REFERENCE TO RELATED APPLICATIONS

This application claims priority to Japanese Patent Application No. 2009-029357 filed on Feb. 12, 2009. The entire disclosure of Japanese Patent Application No. 2009-029357 is hereby incorporated herein by reference.

BACKGROUND

1. Field of the Invention

The present invention generally relates to a content processing device. More specifically, the present invention relates to a content processing device that outputs an audio signal.

2. Background Information

With a conventional television device, a video signal of content is displayed on a display of the television device, and an audio signal of the content is outputted as monaural audio or stereo audio from an internal speaker in the television device, or is outputted as multi-channel audio (e.g., surround audio) from external speakers in accordance with a setting of the television device (see Japanese Laid-Open Patent Application Publication Nos. 2008-61251 and 2008-28950, for example).

More recently, in European digital television broadcasts, it has been stipulated that a plurality of kinds of audio signals (e.g., a plurality of audio types of audio signals) be superimposed in a broadcast signal. FIG. 5 illustrates a description of a component descriptor. FIG. 6 illustrates a list of stream contents and component types.

In European digital broadcast standard ETSI EN 101 154 (Digital Video Broadcasting (DVB); Specification for the user of Video and Audio Coding in Broadcasting Applications based on the MPEG-2 Transport Stream), a plurality of codecs have been stipulated, such as MPEG-1, HE-AAC, Dolby Digital, and Dolby Digital Plus. In European digital broadcast standard ETSI EN 300 468 (Digital Video Broadcasting (DVB); Specification for Service Information (SI) in DVB Systems), component descriptors for describing each codec and channel number are stipulated, as shown in FIGS. 5 and 6.

With the conventional television device, whether or not it meets the above-mentioned European digital broadcast standards, an audio signal to be outputted has to be selected every time a broadcast signal that includes a plurality of kinds of audio signals is received. Also, the kinds of audio signals superimposed in the broadcast signal vary with the broadcast station and the program. Accordingly, when the user connects a surround system to the conventional television device, such as a television receiver, and mainly listens to a surround audio, the user has to select the surround audio every time, which makes audio selection more complicated.

Another problem is that even if the broadcast signal does not include the surround audio, or if the user decides to listen to monaural/stereo audio, the kind of audio signal has to be selected each time.

SUMMARY

The present invention was conceived in light of the above-mentioned problems. One object of the present invention is to provide a content processing device with which an audio signal can be properly selected when the content includes a plurality of audio signals.

In accordance with one aspect of the present invention, a content processing device includes an input section, a memory section, a selection section and an output section. The input section is configured to receive content having a video signal and a plurality of audio signals with different audio types. The memory section is configured to store selection information indicative of a predetermined audio type, and order information indicative of a preset order of a plurality of audio types. The selection section is configured to select one of the audio signals based on the selection information and the order information. The output section is configured to output the video signal and the one of the audio signals that was selected by the selection section.

With this content processing device, it is possible to provide a content processing device with which an audio signal can be properly selected when the content includes a plurality of audio signals.

BRIEF DESCRIPTION OF THE DRAWINGS

Referring now to the attached drawings which form a part of this original disclosure:

FIG. 3A is a diagram illustrating how an audio signal is selected based on selection instruction information that is stored in a memory of the set-top box illustrated in FIG. 2;

FIG. 3B is a diagram illustrating how an audio signal is selected based on an insertion order that is stored in a memory of the set-top box illustrated in FIG. 2;

FIG. 3C is a table illustrating a selection list that is stored in the memory of the set-top box illustrated in FIG. 2;

FIG. 5 is a table illustrating a description of a component descriptor;

FIG. 6 is a table illustrating a list of stream contents and component types;

DETAILED DESCRIPTION OF EMBODIMENTS

A preferred embodiment will now be explained with reference to the drawings. It will be apparent to those skilled in the art from this disclosure that the following descriptions of the preferred embodiment are provided for illustration only and not for the purpose of limiting the invention as defined by the appended claims and their equivalents.

Figure 1:
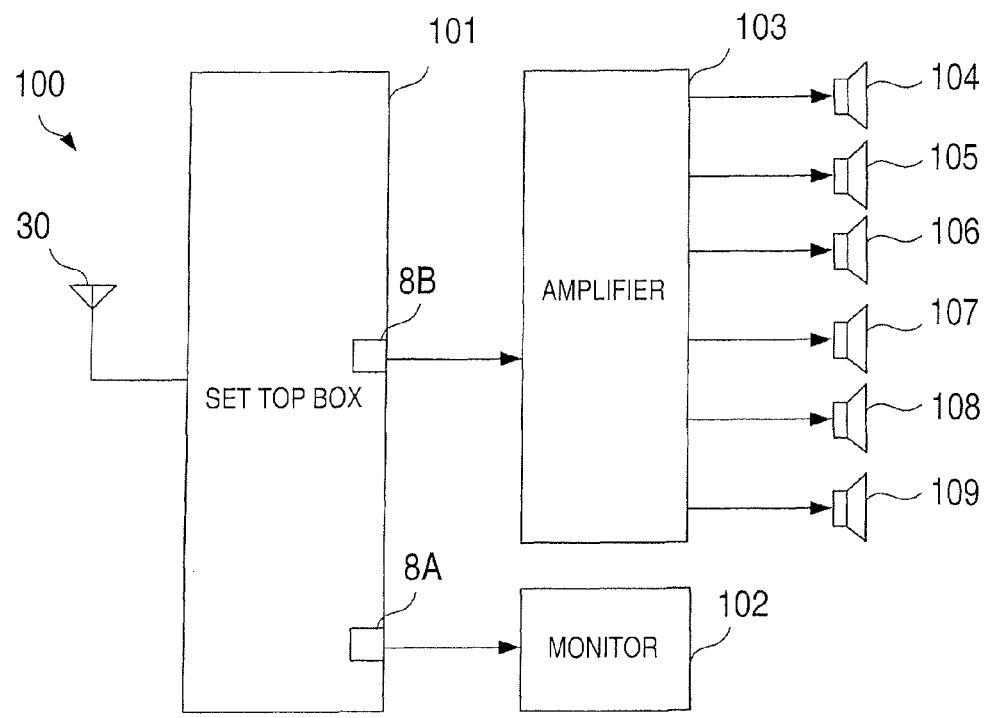
FIG. 1 is a block diagram illustrating an AV system including a set-top box in accordance with one embodiment.

FIG. 1 is a block diagram of an AV system 100. The AV system 100 includes a set-top box (hereinafter "STB") 101, a monitor 102, an amplifier 103, and speakers 104 to 109. The STB 101 demodulates and decodes a television broadcast signal received by an antenna 30, and outputs a video signal through an output interface (e.g., output I/F) 8A to the monitor 102. The monitor 102 displays television programs and other such video. Also, the STB 101 outputs audio signals through an output interface (e.g., output I/F) 8B to the amplifier 103. If the audio signal inputted from the STB 101 is a surround audio signal, then the amplifier 103 outputs different audio signals to the speakers 104 to 109 to create surround audio. Also, if the audio signal inputted from the STB 101 is a monaural audio signal or a stereo audio signal, then the amplifier 103 outputs the audio signal to different speakers according to the audio signal, to create monaural audio or stereo audio.

Figure 2:
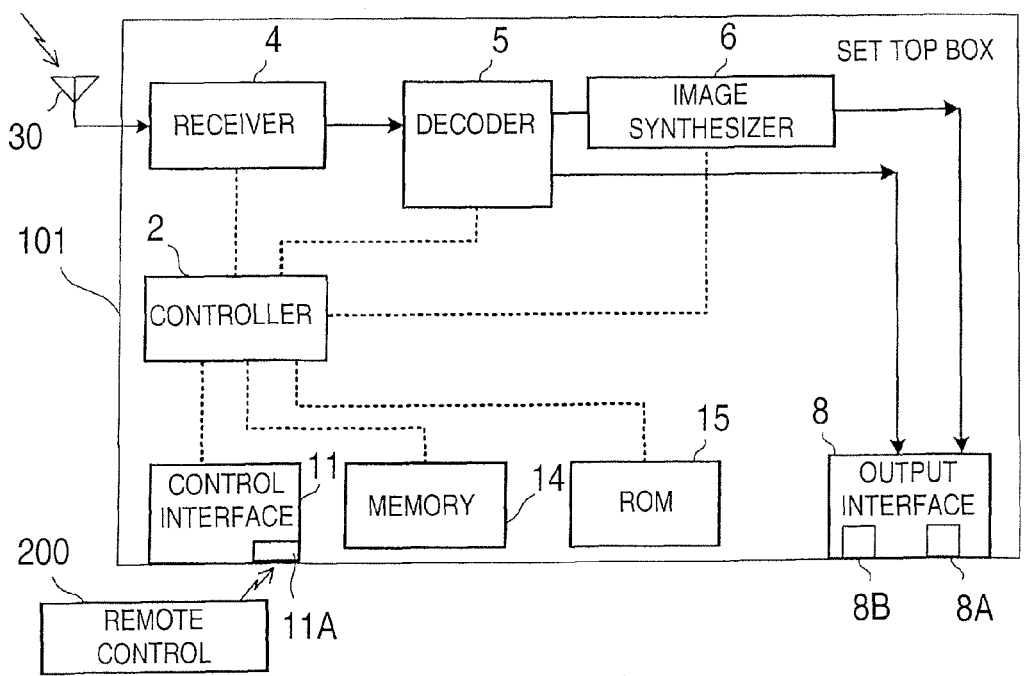
FIG. 2 is a block diagram of the set-top box.

FIG. 2 is a block diagram of the STB 101. The STB 101 includes a controller (e.g., selection section or selection means) 2, a receiver (e.g., input section or input means) 4, a decoder 5, an image synthesizer 6, an output interface (e.g., output section or output means) 8, a control interface 11, a data memory (e.g., memory section or memory means) 14, and a read-only memory (ROM) 15. The controller 2 controls the operation of the various components of the STB 101. The receiver 4 receives a television broadcast signal of a selected channel (CH), and demodulating the television broadcast signal into digital data. The decoder 5 separates the demodulated digital data into a video signal and an audio signal, and decodes both signals. The image synthesizer 6 synthesizes the desired OSD (on screen display) image into the video signal. Furthermore, the output interface 8 outputs the video signals and the audio signals to an external connection device. The output interface 8 includes the output interfaces 8A and 8B. In addition, the control interface 11 is operated by the user. The memory 14 stores audio signal selection instruction information and the like. The ROM 15 stores control programs for the STB 101.

The control interface 11 has a light receiver 11A that receives signals sent from a remote control 200. The control interface 11 and the remote control 200 have the same keys for inputting a command to the STB 101.

The memory 14 includes an EEPROM, for example. The memory 14 stores selection instruction information and a selection list. The selection instruction information is inputted by the user with the control interface 11 or the remote control 200. The selection instruction information directs the selection of a certain kind of audio signal (e.g., a predetermined audio type). The selection list records information about the order (e.g., order information) in which a plurality of kinds of audio signals are selected. In other words, the selection list indicates a preset order of the plurality of kinds of audio signals. For instance, the memory 14 stores information instructing the selection of a surround audio signal as the selection instruction information. Also, the memory 14 stores a list of component types and stream contents shown in FIG. 6, for example, as the selection list of the plurality of kinds of audio signals, such that the audio signals can be selected in the order of the list.

The ROM 15 has been loaded with control programs describing the method for controlling the various components of the STB 101.

The controller 2 includes a CPU (central processing unit), for example. The controller 2 has a built-in RAM (not shown) as a work field for expanding data processed by the above-mentioned control programs and so forth, and a clock (not shown) for keeping track of the current time.

The receiver 4 receives (or extracts) and outputs a television broadcast signal for a physical channel selected based on a command from the controller 2 from among television broadcast signals received by the antenna 30. The receiver 4 demodulates the television broadcast signal, and acquires and outputs a transport stream (hereinafter "TS"), which is digital data. In this TS, TS packets containing various television program images, a plurality of kinds of audio, and other such element signals are multiplexed. Also, each of the audio signals contained in the TS includes information about stream content (stream_content) and component type (component_type) shown in FIG. 6, as an identifier of each of the audio signals. The stream content generally expresses or represents the type of stream (video, audio, or EBU-data). The component type generally expresses or represents the type of video or audio element (component). For example, as shown in FIG. 6, if the stream content is 0x02 and the component type is 0x03, then this means that the audio signal includes MPEG-1 Layer 2 stereo audio.

The decoder 5 separates and extracts the video signal, audio signal, and control signal from the TS outputted from the receiver 4. The separated and extracted video signal is encoded by MPEG, for example, based on the component descriptor. The decoder 5 then decodes and outputs the video signal. The outputted video signal is inputted through the image synthesizer 6 to the output interface 8 (e.g., output interface 8A). The decoder 5 also decodes the audio signal and outputs it to the output interface 8 (e.g., output interface 8B).

The image synthesizer 6 has a built-in image memory (not shown) that stores an OSD (on screen display) having text or graphics. The image synthesizer 6 synthesizes the OSD stored in the image memory and an image based on the video signal based on a command from the controller 2. The image synthesizer 6 outputs the synthesized video signal to the output interface 8. Alternatively, the image synthesizer 6 outputs the inputted video signal directly to the output interface 8 based on a command from the controller 2.

The output interface 8 is an interface for connecting the monitor 102, the amplifier 103, or another such externally connected device. The standard used for the output interface is preferably a standard for transferring video or audio signals such as HDMI or SPDIF. With the configuration illustrated in FIGS. 1 and 2, the output interface 8A outputs the video signal, and the output interface 8B outputs the audio signal.

The monitor 102 converts the digital video signal inputted from the STB 101 into an analog video signal, and displays video on a display component (not shown) of the monitor 102.

The amplifier 103 converts the digital audio signal inputted from the STB 101 into an analog audio signal, and outputs audio signals to the speakers 104 to 109 according to the number of signals (number of channels) included in the inputted audio signal. For instance, if the inputted audio signal is a surround audio signal (an audio signal with 5.1 channels), then the amplifier 103 outputs different audio signals to each of the speakers 104 to 109. If the inputted audio signal is a monaural audio signal (an audio signal with one channel), then the amplifier 103 outputs an audio signal to the speaker 104. If the inputted audio signal is a stereo audio signal (an audio signal with two channels), then the amplifier 103 outputs different audio signals to the speakers 104 and 105.

With the AV system 100, the user can see the video displayed on the monitor 102 and listen to the audio outputted by the speakers 104 to 109.

Next, how the audio signal is selected will be described through reference to FIGS. 3A, 3B and 3C. FIGS. 3A, 3B and 3C are diagrams illustrating the types of audio signals included in the TS for a certain program, and the selection method according to different conditions.

With the STB 101, the user operates the control interface 11 or the remote control 200 to adjust the settings ahead of time so that a surround audio signal will be preferentially selected, and stores the settings in the memory 14 as selection instruction information. In this case, if a surround audio signal is included in the audio signals included in the TS of a program (content), then as shown in FIG. 3A, the surround audio signal (Dolby Digital Plus in FIG. 3A) is selected by the controller 2.

Usually there is only one surround audio signal included in the TS of a program. However, if there are two or more surround audio signals, then the settings are adjusted as follows. Specifically, the user presets his preferred kind of surround audio signal (e.g., one of a plurality of surround audio types) as a preferred surround audio type, and stores it in the memory 14. When the television broadcast signal is received, if a plurality of surround audio signals is included in the TS of the program, then the surround audio signal corresponding to the preferred surround audio type is determined by referring to the memory 14.

The number of speakers (e.g., number of channels) of the AV system 100 can also be inputted ahead of time as an audio channel number. For example, if the AV system 100 includes a 5.1-channel surround system, then a 7.1-channel or 8.1-channel audio signal cannot be reproduced even if selected. Accordingly, the audio signals that can be properly reproduced can be selected by setting the number of speakers (number of channels) in advance as the audio channel number, and referring to the audio channel number.

Also, with the STB 101, if the settings have been adjusted so that a surround audio signal is selected preferentially, but the TS of the program does not include any surround audio, and if the settings have not been adjusted so that a surround audio signal will be preferentially selected, then one of the following methods is selected to be applied based on a preset setting.

1. Selection of the First Audio Signal to be Inserted

If the user has adjusted the settings so that the first audio signal to be inserted is selected, then as shown in FIG. 3B, the STB 101 selects the audio signal based on the insertion order in FIG. 3B such that the audio signal having number one in the insertion order is selected ("MPEG1" in FIG. 3B). The insertion order is information indicative of an order of the audio signals. The insertion order is included in the TS of the program, for example, or preset in advance for the TS of the program, and stored in the memory 14 in association with the TS of the program.

2. Selection of Audio Signal According to Selection List

If the settings have been adjusted so that an audio signal is selected according to a selection list (e.g., order information, or information about the order of selection), then the STB 101 reads from the memory 14 the selection list that the user has inputted ahead of time (e.g., the selection list shown in FIG. 3C). The controller 2 then selects an audio signal based on the selection order set up in the selection list. For example, if one of the audio signals includes HE-AAC_stereo, which is on the top of the selection list, then the controller 2 selects this audio signal having HE-AAC_stereo as an audio type.

3. Selection of Audio Signal According to Past Selection History

If an audio signal is selected according to the selection list, and any of the audio signals that are listed on this selection list is not contained in the TS of the program, then the STB 101 selects an audio signal according to the past selection history. Specifically, the memory 14 of the STB 101 stores the kinds of audio signals (e.g., audio types) that have been selected over a specific period in the past. If any of the audio types listed on the selection list is not included in the TS, then the controller 2 checks the past selection history by referring to the memory 14, and selects an audio signal having an audio type included in this history. If a plurality of the audio signals included in the TS are included in the past selection history, the audio signal that has been selected most often in the past is selected. In other words, if a plurality of the audio signals included in the TS matches with the past selection history, then an audio signal having an audio type that has been selected most often in the past is selected.

If none of the audio signals included in the TS of the program is in the past selection history, then a message to the user recommending selection of a desired audio signal is displayed on the monitor 102, or this message is conveyed as an audible notice.

Figure 4:
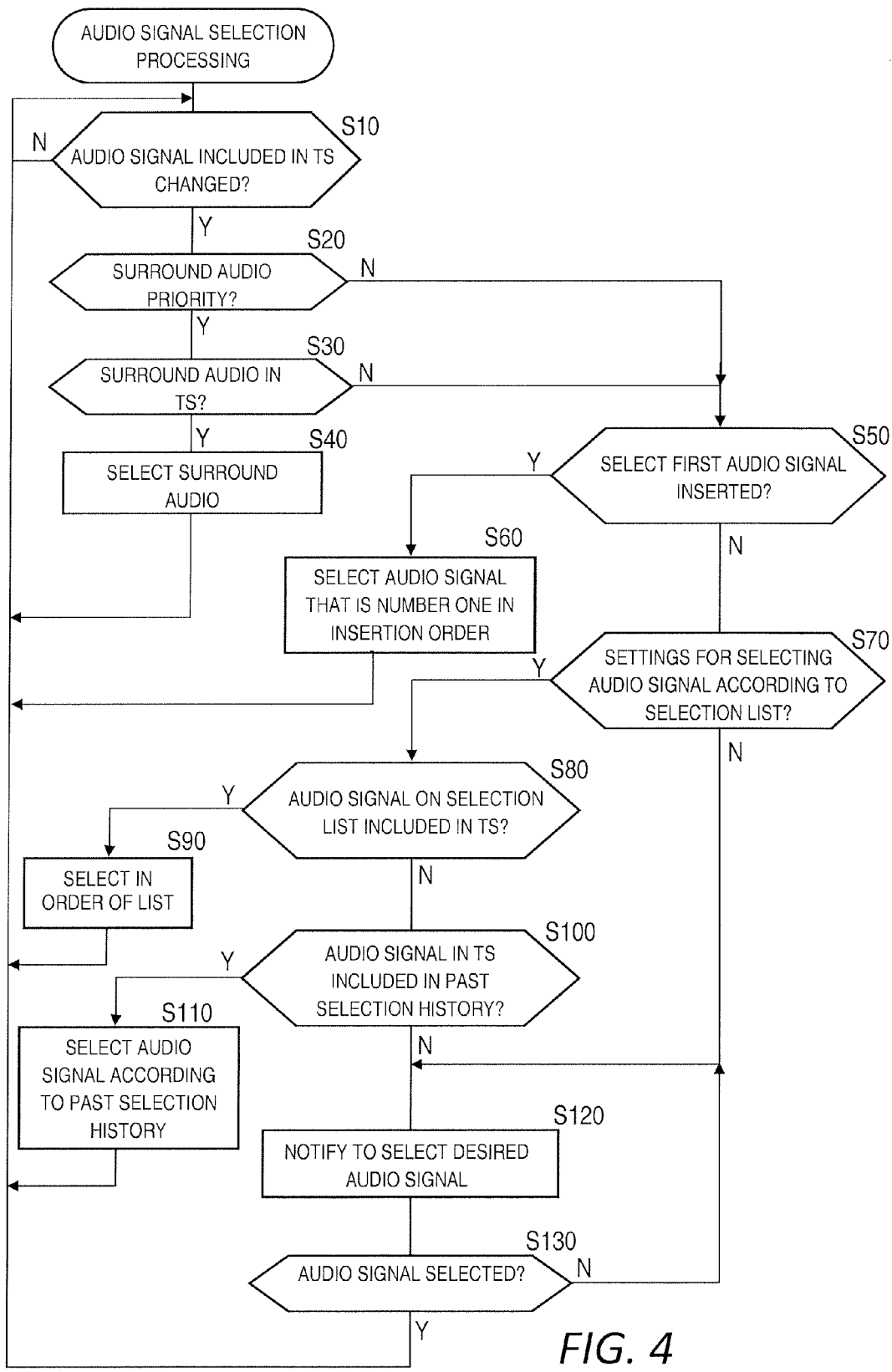
FIG. 4 is a flowchart illustrating a selection process of an audio signal.

Next, the processing for selecting an audio signal by the STB 101 will be described through reference to FIG. 4. FIG. 4 is a flowchart illustrating the selection process of an audio signal by the STB 101.

The controller 2 of the STB 101 is in standby mode as long as there is no change in the kinds of audio signals included in the TS ("No" in step S10).

If it is detected that the user has switched on the power to the STB 100, or changed the channel, that a program being broadcast has changed to another program, or that the kinds of audio signals included in the program TS has changed ("Yes" in step S10), then the controller 2 confirms whether or not the settings have been adjusted so that a surround audio signal will be preferentially selected (step S20). In other words, the controller 2 confirms whether or not a priority is given to the surround audio signal.

If the settings have been adjusted so that a surround audio signal will be preferentially selected ("Yes" in step S20), then the controller 2 confirms whether or not a surround audio signal is included in the TS of the program (step S30). If a surround audio signal is included in the TS of the program ("Yes" in step S30), then the controller 2 selects the surround audio signal (step S40) and then performs the processing of the step S10.

On the other hand, if the settings have not been adjusted so that a surround audio signal will be preferentially selected in step S20 ("No" in step S20), and if the TS of the program does not contain surround audio in step S30 ("Yes" in step S30), then the controller 2 performs the following processing.

Specifically, if the user has changed the settings so that the first audio signal to be inserted will be selected ("Yes" in step S50), then the controller 2 selects the audio signal that is number one in the insertion order (step S60), and then performs the processing of step S10.

If the settings have been adjusted so that the audio signal will be selected according to a selection list ("No" in step S50, then "Yes" in step S70), then the controller 2 reads from the memory 14 the selection list inputted ahead of time by the user. If the TS of the program includes the audio signals on the selection list ("Yes" in step S80), then an audio signal is selected based on the selection order set up in this selection list (step S90). The processing in step S10 is then performed.

If the TS of the program does not include any of the audio signals on the selection list ("No" in step S80), then the controller 2 checks the past selection history by referring to the memory 14. If a plurality of audio signals included in the TS of the program is included in the past selection history ("Yes" in step S10), then the controller 2 selects an audio signal that has been selected most often in the past (step S110). The processing in step S10 is then performed.

On the other hand, if the audio signal included in the TS of the program is not included in the past selection history ("No" in step S100), and if in step S70 the settings have not been adjusted so that an audio signal will be selected according to the selection list ("No" in step 70), then the controller 2 either displays on the monitor 102 a message to the user recommending the selection of the desired audio signal, or conveys this message as an audible notice (step S120).

Until it detects that an audio signal has been selected by the user, the controller 2 continues this notification ("No" in step S130), and when it detects that an audio signal has been selected by the user ("Yes" in step S130), it performs the processing in step 10.

As discussed above, with the STB 101, if the TS of the program includes a plurality of audio signals, and if the settings have been adjusted so that surround audio will be selected, then surround audio is automatically selected. If the TS includes no surround audio, then the STB 101 selects an audio signal based on a preset method. Therefore, the user does not need to adjust audio settings every time the channel or program changes, and the user can view programs while enjoying surround audio.

In the above description, an example is given in which the digital television broadcast signal is received, but the example is not limited to this, and can be applied to another method. For instance, a reproduction component for reproducing content recorded to an optical disk, hard disk, or other such recording medium, with the content including a video signal and a plurality of audio signals, can replace the receiver 4 of the STB 101, or can be added thereto. Thus, the selection process of the audio signals can be applied to the content recorded to the recording medium.

With the STB 101, a certain kind of audio signal is selected from among a plurality of audio signals included in content based on the selection instruction information that directs the selection of a certain kind of audio signal, and the information about the order in which a plurality of kinds of audio signals are selected. Therefore, there is no need to select the audio signal every time the content is reproduced, which simplifies the setting of the audio signal.

Also, with the STB 101, if the selection instruction information directs the selection of a surround audio signal, then the surround audio signal is selected from among the plurality of kinds of audio signals. Therefore, the surround audio signal need not be selected every time the content is reproduced, which is more convenient for the user.

Also, with the STB 101, if the plurality of kinds of audio signals does not include a surround audio signal, then an audio signal is selected based on the information about the order of selection. Therefore, even if no surround audio is included in the content, an audio signal can be chosen without the user having to select the audio signal.

Also, with the STB 101, if any of the audio signals is not included in the information about the order of selection, then an audio signal is selected based on the selection history stored in the memory 14. Therefore, an audio signal can always be chosen.

With the STB 101, if the content includes a plurality of kinds of audio signals, and the user adjusts the settings so as to hear surround audio, then the surround audio can be selected. Furthermore, if the surround audio is not included, then an audio signal is selected in a preset order. Therefore, there is no need to select an audio signal every time the content is reproduced, and this simplifies the setting of audio signals.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only a preferred embodiment has been chosen to illustrate the present invention, it will be apparent to those skilled in the art from this disclosure that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Thus, the foregoing descriptions of the embodiment according to the present invention are provided for illustration only, and not for the purpose of limiting the invention as defined by the appended claims and their equivalents.

What is claimed is:

1. A content processing device comprising:
    an input section configured to receive content having a video signal and a plurality of audio signals with different audio types from a broadcast signal;
    a memory section configured to store selection information indicative of a predetermined audio type, and order information indicative of a preset order of a plurality of audio types;
    a selection section configured to select one of the audio signals included in the broadcast signal based on the selection information and the order information in response to determining that the audio signals included in the broadcast signal have changed; and
    an output section configured to output the video signal and the one of the audio signals that was selected by the selection section,
    the selection section being further configured to select the one of the audio signals based on preset information indicative of a number of speakers that are physically connected to the content processing device such that an audio signal requiring more speakers than the number of speakers indicated by the preset information is prevented from being selected in response to determining that the audio signals have a plurality of surround audio signals, with the preset information being inputted to the content processing device in advance.

2. The content processing device according to claim 1, wherein
    the selection section selects a surround audio signal from among the audio signals while the selection information indicates a surround audio as the predetermined audio type.

3. The content processing device according to claim 2, wherein
    the selection section selects an audio signal other than the surround audio signal from among the audio signals based on the order information while the audio signals do not includes the surround audio signal.

4. The content processing device according to claim 3, wherein
    the memory section is further configured to store selection history information indicative of audio types that have been selected, and
    the selection section selects an audio signal from among the audio signals based on the selection history information in response to the order information including none of the different audio types of the audio signals.

5. The content processing device according to claim 4, wherein
the selection section selects an audio signal having an audio type that has been selected most often in the selection history information in response to the different audio types of the audio signals including a plurality of audio types that matches with the selection history information.

6. A content processing method comprising:
receiving content that has a video signal and a plurality of audio signals with different audio types from a broadcast signal;
providing selection information indicative of a predetermined audio type, and order information indicative of a preset order of a plurality of audio types;
selecting one of the audio signals included in the broadcast signal based on the selection information and the order information in response to determining that the audio signals included in the broadcast signal have changed; and
outputting the video signal and the one of the audio signals,
the selecting of the one of the audio signals further including selecting the one of the audio signals based on preset information indicative of a number of speakers that are physically connected to a content processing device such that an audio signal requiring more speakers than the number of speakers indicated by the preset information is prevented from being selected in response to determining that the audio signals have a plurality of surround audio signals, with the preset information being inputted to the content processing device in advance.

7. The content processing device according to claim 1, wherein
the order information stored in the memory section indicates the preset order of the audio types that has been preset by a user of the content processing device.

8. The content processing device according to claim 1, wherein
the selection section is further configured to select the one of the audio signals included in the broadcast signal based on an insertion order indicative of an order of the audio signals in the broadcast signal such that an audio signal that is the first in the insertion order is selected while the selection section is set to select the one of the audio signals based on the insertion order.

9. A content processing device comprising:
an input section configured to receive content having a video signal and a plurality of audio signals with different audio types from a broadcast signal;
a memory section configured to store selection information indicative of a predetermined audio type, and order information indicative of a preset order of a plurality of audio types;
a selection section configured to select one of the audio signals included in the broadcast signal based on the selection information and the order information in response to determining that the audio signals included in the broadcast signal have changed; and
an output section configured to output the video signal and the one of the audio signals that was selected by the selection section,
the selection section being further configured to select an audio signal having the predetermined audio type from among the audio signals in response to determining that the audio signals included in the broadcast signal have the audio signal having the predetermined audio type,
the selection section being further configured to determine whether the audio signals included in the broadcast signal has an audio signal with an audio type that is listed in the order information according to the preset order of the audio types in the order information in response to determining that the audio signals included in the broadcast signal do not have the audio signal having the predetermined audio type, the selection section being further configured to select the audio signal with the audio type that has been given a higher priority in the preset order than the other audio types in the order information.

10. The content processing device according to claim 4, wherein
the output section is configured to output a notification that prompts a user to manually select a desired audio signal in response to determining that the audio signals included in the broadcast signal do not include an audio signal with an audio type that is indicated in the selection history information.

11. The content processing device according to claim 10, wherein
the output section is configured to display a message that prompts the user to manually select the desired audio signal as the notification.

12. The content processing device according to claim 11, wherein
the output section is configured to output an audible message that prompts the user to manually select the desired audio signal as the notification.

* * * * *